(No Model.) 2 Sheets—Sheet 1.
F. H. RICHARDS.
PNEUMATIC MOTOR.
No. 445,601. Patented Feb. 3, 1891.
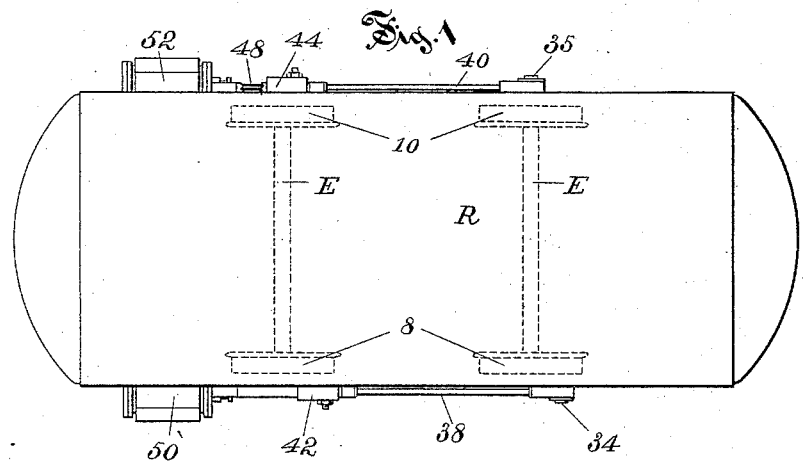
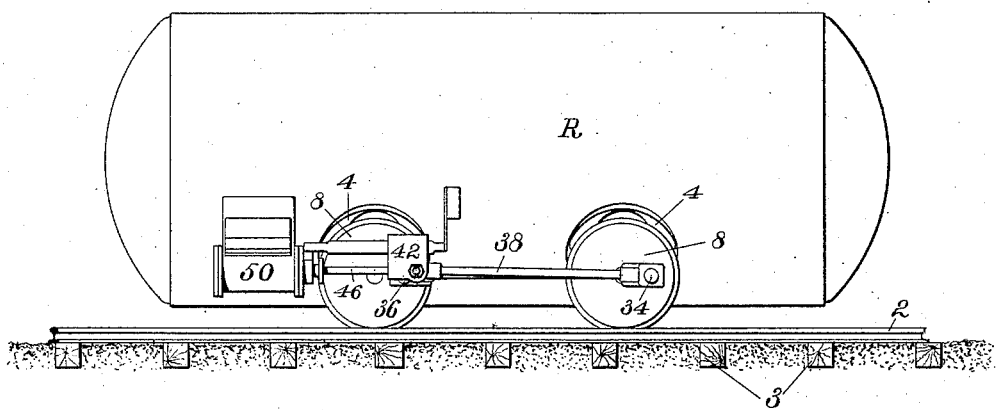
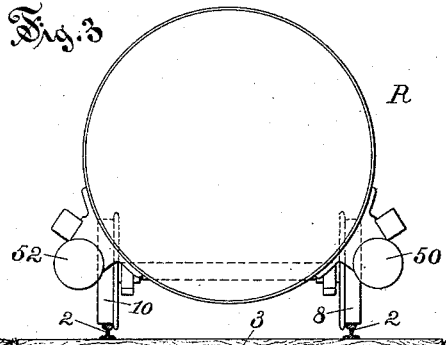
Witnesses:
W. M. Bjorkman
Henry L. Reckard
Inventor:
Francis H. Richards

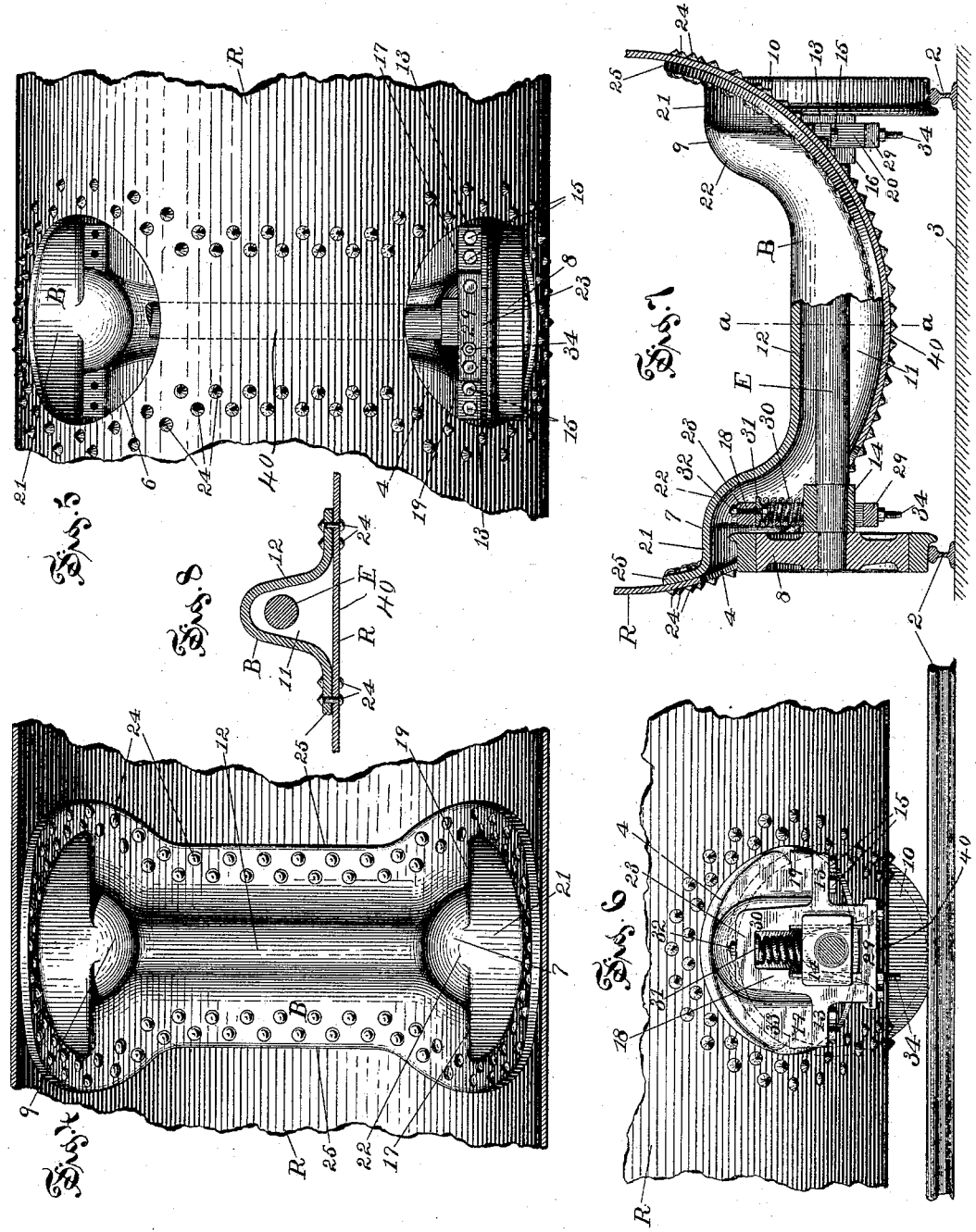

UNITED STATES PATENT OFFICE.

FRANCIS H. RICHARDS, OF HARTFORD, CONNECTICUT, ASSIGNOR TO ECKLEY B. COXE, OF DRIFTON, PENNSYLVANIA.

PNEUMATIC MOTOR.

SPECIFICATION forming part of Letters Patent No. 445,601, dated February 3, 1891.

Application filed April 4, 1889. Renewed July 11, 1890. Serial No. 358,398. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Pneumatic Motors, of which the following is a specification.

This invention relates to pneumatic motors and to the construction of the tank and framework thereof, the object being to utilize the tank as the principal part of the frame-work, and also to provide a system or mode of motor construction which permits the use of a very large tank or reservoir relatively to the other parts of the motor.

In the drawings accompanying and forming a part of this specification, Figure 1 is a plan view of a structure embodying my present improvements. Fig. 2 is a side elevation of the same. Fig. 3 is an end elevation. Fig. 4 is a plan or top view of one portion of the lower part of the tank-shell, together with the member carrying the driving-boxes, jaws, and axle. Fig. 5 is an inverted plan view of the portion shown in Fig. 4, and is drawn in projection therewith. Fig. 6 is a side elevation of said parts and other minor details. Fig. 7 is an end elevation, partially in section, of the parts shown in Fig. 6. Fig. 8 is a section in line *a a*, Fig. 7.

Similar characters designate like parts in all the figures.

My present improvements are especially designed for use in connection with a tank or reservoir R, of larger diameter than the width or "gage" of the track, whose rails 2 2 lie on the usual cross-ties 3; but it should be understood that some of said improvements are equally applicable to smaller reservoirs which are set so low down that the lower line thereof is below the motor-axles. The reservoir has in the sides thereof openings or perforations 4 and 6, into which the upper edges of the wheels 8 and 10 project. Said openings are covered by a re-enforcing frame B, whose opposite and similarly-formed ends 7 and 9 are inwardly deflected or "bulged" to form a kind of arch for resisting the pressure of air within the tank R, and to form pockets for the said upper edges of the wheels. The middle portion 12 of said frame B forms an arched beam which connects the two arches 7 and 9, and forms a channel 11 within the shell R (see Figs. 7 and 8) for the axle E, carrying the wheels 8 and 10. This axle is or may be carried in driving-boxes 14 16, which are fitted to slide vertically in the axle-box frames 18 20, that are secured by their projecting-arms 13 and bolts 15 to the abutments 17 19, formed on the re-enforcing frame B. To obtain said abutments and secure at the same time other necessary or desirable features of the frame B, I form the arch thereof in two principal parts, of which the part 21 constitutes the wheel-pocket proper, while the smaller part 22 forms an arch over the upper end 23 of the axle-box frame 18. The abutment portions 17 and 19 form connecting-sections on either side of the dome or arch 22 for uniting the edges of said dome with the arched portion 21. The edges 25 of the member or cross-frame B are tightly joined to the shell R by numerous rivets or bolts 24, after the usual manner of the boiler-making art. This re-enforces the sheet R around the said openings therein and gives to the whole structure a high degree of strength and rigidity.

In practice, when the parts are proportioned about as shown, the frame B may be a steel casting and the sheet or sheets R of rolled-steel plate, and in the drawings the scale adopted is supposed to show a track of the standard gage of four feet eight and one-half inches, and a tank designed for holding air at a pressure of about two hundred and fifty pounds per square inch. The shell R, being cylindrical and having the continuous and broad portion 40 extending between the oppositely-disposed openings 4 and 6, is not so greatly weakened by the presence of said openings but that the frame B, when made of suitable material and properly fastened in place, is sufficient to restore to the structure the loss of strength due to said openings.

The springs 30, for supporting the weight of tank and machinery, are placed within the axle-box frame above the axle-boxes 14 16, being guided at the top by a plate 31, held in place by bolt 32. The usual wedge 33, operated by bolt 34, carried in cap 29, is employed for regulating the lateral play of the axle-box 14 or 16 in its frame.

The wheels, when the apparatus is provided with engines, are furnished with crank-pins 34 36 and 35 37, (see Figs. 1 and 2,) by which the two axles are driven by the main rods 38 40 and the usual parallel rods (not fully shown) through the cross-heads 42 44 and piston-rods 46 48 from the cylinders 50 or 52, respectively. The cylinders are or may be attached directly to the tank, as shown, and are to be furnished with a suitable valve-gear. (Not shown.) This gear, owing to the arrangement of the axles, is preferably one operated from the cross-heads, since it is inconvenient to employ the eccentrics of the usual "Stephenson" link-motion. Other necessary and convenient details not relating to the present improvements are omitted.

The several features of my present improvements which are shown and described, but are not claimed herein, are made the subject-matter of a separate application, Serial No. 325,666, filed October 1, 1889.

Having thus described my invention, I claim—

1. In a structure of the class specified, the combination, with the cylindrical tank-shell having oppositely-disposed perforations therein near the lower side thereof, said perforations being separated by a continuous portion of said shell, of the axle passing through said perforations and the interior of said shell, and a re-enforcing frame, substantially as described, secured within said tank and covering said perforations and axle, all substantially as described.

2. In a structure of the class specified, the combination, with the cylindrical tank-shell having the oppositely-disposed perforations in the sides thereof, of the axle passing through said perforations and the interior of said shell, a re-enforcing frame, substantially as described, secured within the tank and covering said perforations and axle, wheels on said axle, the axle-boxes, and the axle-box frames, substantially as described.

3. In a structure of the class specified, the combination, with the tank-shell having perforations in the sides thereof, of the axle passing through said perforations and the interior of said shell, a frame, substantially as described, secured within the tank and covering said perforations and axle, wheels on said axle, and the driving-box frames depending from said frame, the ends of said frame being inwardly arched to form wheel-pockets and shaped to form seats for securing thereto said frames, all substantially as described.

4. In a structure of the class specified, the combination, with the tank-shell R, having perforations 4 and 6, of the frame B, secured within said shell and having its ends inwardly arched to cover said perforations and form outwardly-opening pockets, all substantially as described.

5. In a structure of the class specified, the combination, with the tank-shell, perforated substantially as described, of the frame B within said shell and covering the perforations therein and having seats 17 and 19, the axle-boxes, the frames 18 and 20, secured to said seats and carrying said boxes, and the axle and wheels, all substantially as described.

6. In a structure of the class specified, the combination, with the tank-shell, perforated substantially as described, of the frame B, having oppositely-disposed ends, each inwardly arched to cover the openings in said shell and to form wheel-pockets, the central part of said frame being arched to cover an axle passing through the interior of the shell, said frame being affixed by its outer edges to said shell, substantially as described.

7. In a structure of the class specified, the combination, with the frame B, joined to the shell R and having the wheel-pocket, the frame-seats 17 and 19, and the dome 22, of the frame 18, having arms 13 secured to said seats, the axle and wheels, the axle-boxes, and the springs, all substantially as described.

FRANCIS H. RICHARDS.

Witnesses:
LEWIS C. HEERMANN,
HENRY L. RECKARD.